June 1, 1948.  E. E. COX  2,442,557
DEVICE FOR HOLDING FOOD DURING STORAGE, COOKING, AND SLICING
Filed Dec. 4, 1945

INVENTOR.
EVERETT E. COX
BY
*Dane W. Thergman*
ATTORNEY

Patented June 1, 1948

2,442,557

UNITED STATES PATENT OFFICE 2,442,557

DEVICE FOR HOLDING FOOD DURING STORAGE, COOKING, AND SLICING

Everett E. Cox, Los Angeles, Calif.

Application December 4, 1945, Serial No. 632,653

6 Claims. (Cl. 146—218)

My invention relates generally to food-holding devices, and more particularly to holding devices for facilitating the slicing of foods.

In processing and serving foods in the home, it is often desirable to obtain slices of foods difficult to handle. An object of my invention resides in providing a convenient means of supporting foods in a substantially stationary manner, to permit horizontal slicing.

A further object of my invention resides in providing a practicable means for handling foods, for example, in storage as in a refrigerator, in reheating for table use, and in serving, thereby eliminating the need for additional dishware.

Further objects and advantages of my invention will be manifest from the detailed description to follow, and from the accompanying drawing, in which Fig. 1 is a view in perspective of a preferred embodiment of the device of the invention;

Figure 1:
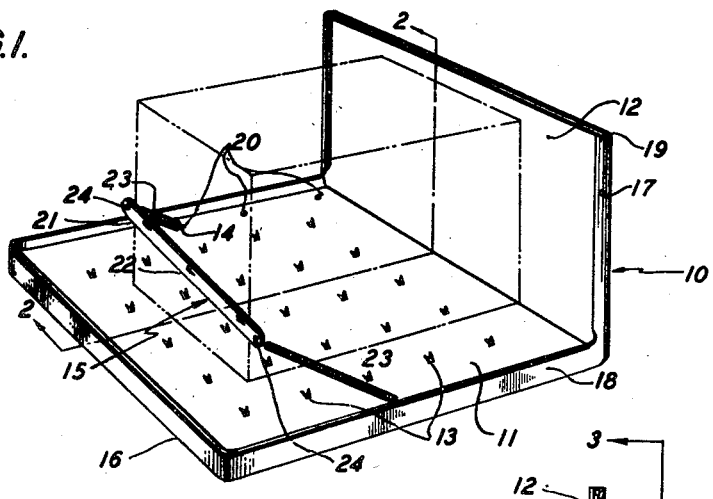
Figure 2:
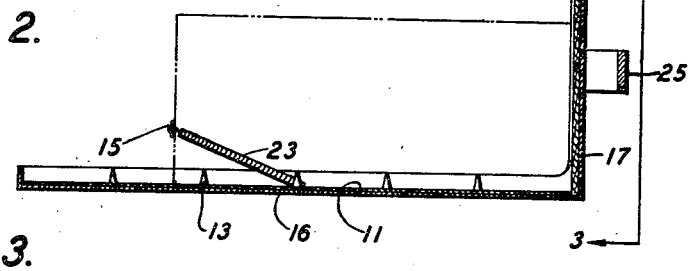
Fig. 2 is a sectional view, along the line 2—2 of Fig. 1.
Figure 3:
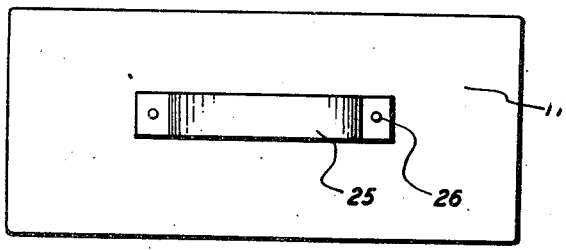
Fig. 3 is an end view, along the line 3—3 of Fig. 2.
Figure 4:
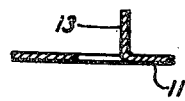
Fig. 4 is an enlarged, sectional view of a prong provided.
Figure 5:
Fig. 5 is an enlarged, plan view of the prong.

Referring particularly to Figs. 1 and 2, a tray member generally designated 10 is shown to have removably disposed therewithin an insert plate 11 and a buffer strip 12. The insert plate 11 provides a multiplicity of upstanding prongs 13, and has attached thereto, for example, by hooks 14 or the like, a spring tension member or clamp, generally designated 15. The shape shown in phantom indicates, for example, a block of cheese or the like, and, similarly, there could be substituted therefor, meat such as a roast, or a cabbage or other vegetable.

The tray member generally designated 10, and preferably fabricated of some lightweight but durable material such as aluminum, provides a base 16, an upturned end 17, and shallow side members 18, the edges of the upturned end 17 being turned back to form grooves 19. The buffer strip 12, preferably of a relatively softer material than the tray member 10, such as, for example, thin plywood, rides in the grooves 19 and abuts the inner side of the upturned end 17. A handle 25 is affixed to the outer side of the upturned end 17 by means of, for example, bolting members 26.

The insert plate 11 provides a multiplicity of prongs 13, which have sharp edges, being formed in the preferred embodiment of portions of the insert plate 11 cut and pushed upward by, for example, a die or other stamping device.

The spring tension member, or clamp, generally designated 15, preferably comprises a steadying member 21 which may, for example, have prongs 22 therewithin, and which is attached to the insert plate 11 by the hooks 14 which are terminations of the springs 23. This construction provides a positive holding tension at various positions, being releasable at will, and being adjustable by means of three holes 20. Eyelets 24 similarly fasten the opposite ends of the springs 23 to the steadying member 21.

In use, food, such as a block of cheese or the like, as indicated in the embodiment illustrated, is placed upon the tray member 10, resting upon the prongs 13 of the insert plate 11, and engaging therewith. The clamp 15 may then be extended a distance suitable to engage the prongs 22 thereof in the food in such a manner as to exert a pressure against the buffer strip 12 sufficient to remain in a fixed position. The food may then be sliced horizontally, parallel to the base 16 of the tray member 10. Steadying the device by grasping the handle 25 prevents injury to the fingers. In this slicing operation the buffer strip 12 serves as a stop to protect the edge of the cutting knife, and is removable for cleaning, or for replacement when worn.

After use as a means to facilitate slicing, the device of the invention may be employed in a variety of uses. For example, the entity, including the food supported thereupon, may be placed in a refrigerator for storage, making use of, for example, the handle 25. Alternatively, the tray member 10 may be used to support and store cold meats, cheese, molds, custards, or the like, the insert plate 11 being first removed therefrom. In all instances the shallow side members 18 serve to keep fats or juices from spilling over when the device is used to support meats, and in general to prevent the fall of any small particles.

It is understood that the embodiment shown and described is for illustrative purpose only, and that the device of the invention may be fabricated of any material suitable for the use intended, and may be designed to any size for general use, or as a particular compartment in, for example, a refrigerator or oven. It is further understood that I do not intend to be limited to the embodiment illustrated, but rather to be entitled to the scope of the appended claims.

I claim:

1. A slicing device. which comprises: a tray member having an upturned end and shallow side members, the edges of said upturned end being turned back to form grooves; a buffer strip inserted into said grooves and abutting said upturned end; an insert plate disposed within said tray, said insert plate being provided with prongs and a flexible clamp attached thereto.

2. A slicing device, which comprises: a tray member having an upturned end and shallow side members, the edges of said upturned end being turned back to form grooves; a buffer strip of hardness substantially equivalent to that of wood inserted into said grooves and abutting said upturned end; an insert plate disposed within said tray, said insert plate being provided with prongs and a flexible clamp attached thereto.

3. A slicing device, which comprises: a tray member having an upturned end and shallow side members, the edges of said upturned end being turned back to form grooves; a buffer strip inserted into said grooves and abutting said upturned end; a removable insert plate disposed within said tray, said insert plate being provided with prongs and a flexible clamp attached thereto.

4. A slicing device, which comprises: a tray member having an upturned end and shallow side members, the edges of said upturned end being turned back to form grooves; a handle member affixed to the outer side of said upturned end; a buffer strip inserted into said grooves and abutting said upturned end; an insert plate disposed within said tray, said inert plate being provided with prongs and a flexible clamp attached thereto.

5. A slicing device adapted for horizontal slicing, which comprises: a tray member having an upturned end and shallow side members, the edges of said upturned end being turned back to form grooves; a buffer strip inserted into said grooves and abutting said upturned end; an insert plate disposed within said tray, said insert plate being provided with prongs and a flexible clamp attached thereto.

6. A device for holding food during storage, cooking, and slicing, comprising: a rectangular tray member provided with a low upstanding rim on three sides and with a relatively tall upstanding wall on the fourth side, said wall having its vertical edges turned back to form grooves; a buffer strip covering the inner face of said wall and retained by said grooves; a handle mounted on the outer surface of said wall; a rectangular insert plate fitting against said tray member within said rim and said wall, said insert plate being provided with upstanding prongs; and a food-retaining clamp attached to said insert plate by a pair of tension springs.

EVERETT E. COX.

REFERENCES CITED

The following references are of record in the file of this patent:

UNITED STATES PATENTS

| Number | Name | Date |
|---|---|---|
| 1,297,712 | Merrill | Mar. 18, 1919 |
| 1,315,101 | Ehrke | Sept. 2, 1919 |
| 1,892,861 | Welty | Jan. 3, 1933 |

FOREIGN PATENTS

| Number | Country | Date |
|---|---|---|
| 177,061 | Great Britain | Mar. 23, 1922 |
| 382,496 | Great Britain | Oct. 27, 1932 |